United States Patent Office 3,086,962
Patented Apr. 23, 1963

3,086,962
PROCESS FOR POLYMERIZING HIGHER LACTAMS
Edward H. Mottus and Ross M. Hedrick, Dayton, Ohio, assignors to Monsanto Chemical Company, St. Louis, Mo., a corporation of Delaware
No Drawing. Filed Oct. 3, 1958, Ser. No. 765,069
24 Claims. (Cl. 260—78)

This invention relates to a novel process for the polymerization of higher lactams containing at least 6 carbon atoms in the lactam ring, e.g. ε-caprolactam, to useful polyamides which are suitable for the production of fibers, films, cast objects and the like. More particularly this invention relates to a novel process for the low-temperature polymerization of higher lactams, and especially of ε-caprolactam, wherein the polymerization process is initiated by an N,N'-substituted urea.

Numerous polymerization processes have been suggested for the polymerization of caprolactam. One method has been the hydrolytic process wherein the caprolactam is heated at an elevated temperature of about 200–300° C. under superatmospheric pressure in the presence of not less than 0.1 mole and preferably from 1 to 4 moles, but less than 10 moles of water in an initial reaction and the polymerization is subsequently continued at atmospheric pressure, or under a reduced pressure to remove the water and unreacted monomer (U.S. Patent No. 2,241,322). The hydrolytic process requires a relatively long period of time to effect a satisfactory degree of polymerization and thus is an expensive process for the commercial production of useful polymers. Another process for the catalytic conversion of caprolactam into polycaprolactam is by the two-stage reaction of the caprolactam in the presence of metallic sodium or any of the alkali or alkaline earth metals. The initial reaction is carried out at 100 to 150° C., and thereafter the polymerization is effected at a temperature of about 230 to 250° C. for a period of 0.5 to 2 hours (U.S. Patent No. 2,251,519). Still another process for the polymerization of caprolactam employs alkali metal hydrides as catalysts and effects the polymerization at temperatures above the melting point of the polycaprolactam and the preferred temperature is in the range of from about 230 to 260° C. (U.S. Patent No. 2,647,105). Another process for the polymerization of caprolactam employs a mixed catalyst of alkali metal hydroxide and alkali metal, or alkali metal amide, or alkali metal hydride, at polymerization temperatures in the range of about 215 to 265° C. (U.S. Patent No. 2,805,214).

The prior art processes in general all require relatively high polymerization temperatures above 200° C. and up to 300° C., and do not provide a high conversion to the desired polymer. Thus, for example, in the polymerization system employing ε-caprolactam the equilibrium conditions are such that the final reaction mixture contains of the order of about 90 percent polymer and 10 percent monomer.

The principal object of this invention is to provide an improved process for the polymerization of higher lactams and especially of ε-caprolactam. Another object of this invention is to provide a process for the polymerization of caprolactam at temperatures below about 200° C. A further object of this invention is to provide a process for the polymerization of caprolactam whereby a high conversion to the polycaprolactam is obtained. Other objects and advantages of this invention will be apparent to those skilled in the art from the following disclosure.

At present ε-caprolactam is the most important member of the higher lactams containing at least 6 carbon atoms in the lactam ring, for example members of the class illustrated by the formula

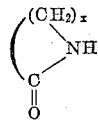

wherein $x$ is an integer of at least 5, and preferably from 5 to about 7, and the instant disclosure is accordingly exemplified therewith. However, it will be understood that other higher lactams such as methylcyclohexanone isoximes, cycloheptanone isoxime, cyclooctanone isoxime, cyclopentadecanone isoxime, cyclic hexamethylene adipamide, etc., can be employed in the instant process.

It has now been found that the class of urea compounds illustrated by the structural formula

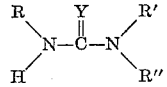

wherein Y is a member selected from the group consisting of O and S; R, R' and R" are monovalent radicals free from reactive groups and R" can be hydrogen; R and R' together can be the divalent tetramethylene group; and R' and R" together can be the divalent polymethylene group $(CH_2)_n$, wherein $n$ is an integer from 2 to 5, are effective promoters for the base-catalyzed polymerization of higher lactams and especially of ε-caprolactam at temperatures below 200° C. The cyclic ureas can also have one or more of the hydrogen atoms of the polymethylene groups substituted by monovalent radicals free from reactive groups, as for example the hydrocarbyl radicals alkyl, cycloalkyl, aryl, aralkyl, and alkaryl radicals preferably containing less than about 10 carbon atoms.

Illustrative examples of the R, R' and R" radicals are the hydrocarbyl radicals such as alkyl, cycloalkyl, aryl, aralkyl and alkaryl, i.e. methyl, ethyl, propyl, isopropyl, n-butyl, sec.-butyl, tert.-butyl, isobutyl, amyl, isoamyl, hexyl, isohexyl, heptyl, octyl, 2-ethylhexyl, nonyl, decyl, undecyl, dodecyl, tridecyl, tetradecyl, hexadecyl, octadecyl, cyclopropyl, cyclobutyl, cyclopentyl, cyclohexyl, bicyclohexylyl, decahydronaphthyl, tetradecahydroanthryl, tetrahydroabietyl, phenyl, biphenylyl, naphthyl, anthryl, benzyl, phenethyl, benzohydryl, α-mesityl, tolyl, xylyl, mesityl, duryl, cumyl, and the like. It will be seen that the term "hydrocarbyl" as employed in the instant specification and appended claims means a monovalent hydrocarbon radical. In general the symmetrically substituted ureas having hydrocarbyl radicals containing up to 20 carbon atoms are the preferred promoters for the polymerization of the higher lactams. However, the aforesaid hydrocarbyl radicals can in turn contain various substituents therein, which are inert in the instant reaction, for example, halogen atoms such as chloro- and bromo-substituted hydrocarbyl radicals, such as haloaryl radicals; alkoxy and related radicals such as methoxy, ethoxy, propoxy, phenoxy, toloxy, and other modified hydrocarbon radicals containing the oxa or thia structure; tertiary amino radicals such as dimethylamino, diethylamino, ethylmethylamino, and the like; other modified hydrocarbyl radicals such as those containing silicon atoms, e.g. trimethylsilylmethyl, diphenylmethylsilylmethyl, p-chlorophenyldimethylsilylmethyl; and the like. When R and R', or R' and R", together provide a cyclic urea the tetramethylene chain, or polymethylene chain, can also contain various inert substituents similar to the monovalent hydrocarbyl radicals. Thus, from the aforesaid disclosure it will be seen that the urea promoter compounds are N,N'-disubstituted and N,N,N'-trisubstituted ureas and thioureas, and mixtures thereof, and that two of the nitrogen bonds, e.g. N,N or N,N', can be linked through a divalent group to provide a nitrogen-containing heterocyclic ring in the promoter compound.

Specific illustrative urylenes and thiourylenes which are suitable for use as promoters for the polymerization of the higher lactams are, for example:

1,3-dimethylurea,
Trimethylurea,
1,3-diethylurea,
1,3-dipropylurea,
1,3-dibutylurea,
1,3-dihexylurea,
1,3-dioctylurea,
1,3-didodecylurea,
1,3-di-n-octadecylurea,
1-methyl-3-ethylurea,
1-ethyl-3-hexylurea,
1-butyl-3-(2-ethylhexyl)urea,
1-methyl-3-phenylurea,
1-ethyl-3-phenylurea,
1-isopropyl-3-phenylurea,
1-n-butyl-3-phenylurea,
1-n-dodecyl-3-phenylurea,
1,1-dimethyl-3-phenylurea,
1,1-n-dibutyl-3-phenylurea,
1,1-dimethyl-3-(m-tolyl)urea,
1,1-diethyl-3-(p-ethylphenyl)urea,
1,1-dimethyl-3-(2-naphthyl)urea,
1,1-dimethyl-3-(2-biphenyl)urea,
1-ethyl-3-ethyl-3-phenylurea,
1-ethyl-3-naphthylurea,
1-methyl-3-tetrahydronaphthylurea,
1-ethyl-3-(p-ethoxyphenyl)urea,
1-methyl-3-(p-chlorophenyl)urea,
1,1-dimethyl-3-(p-chlorophenyl)urea,
1,1-diethyl-3-(p-chlorophenyl)urea,
1-methyl-1-ethyl-3-(p-chlorophenyl)urea,
1,1-diisopropyl-3-(o-chlorophenyl)urea,
1,1-di-n-octyl-3-(p-chlorophenyl)urea,
1,1-dicyclohexyl-3-(p-chlorophenyl)urea,
1,1-dimethyl-3-(3-chloro-4-tert.-butyl)urea,
1,1-dimethyl-3-(2,4-dichlorophenyl)urea,
1,1-diethyl-3-(2,4,6-trichlorophenyl)urea,
1,1-dimethyl-3-(4-chloronaphthyl)urea,
1,1-dimethyl-3-(p-butoxyphenyl)urea,
1,1-dimethyl-3-(o-ethoxyphenyl)urea,
1,1-dimethyl-3-(p-methoxyphenyl)urea,
1-(3-dimethylaminopropyl)-3-phenylurea,
1-(β-diethylaminoethyl)-3-mesitylurea,
1-(β-diethylaminoethyl)-1-methyl-3-mesitylurea,
1-n-propyl-3-(4-bromo-2-methylphenyl)urea,
1,3-di(4-chloro-2-methoxyphenyl)urea,
1,3-dicyclopropylurea,
1,3-dicyclopentylurea,
1,3-dicyclohexylurea,
1,3-dibicyclohexylurea,
1,3-didecahydronaphthylurea,
1,3-diphenylurea,
1,3-dibiphenylurea,
1,3-dinaphthylurea,
1,3-dibenzylurea,
1,3-diphenethylurea,
1,3-ditolylurea,
1,3-dixylylurea,
1,3-di(trimethylsilylmethyl)urea,
1,3-di(diphenylmethylsilylmethyl)urea,
1,3-di(p-chlorophenyldimethylsilylmethyl)urea,
Tetramethyleneurea,
1,1-pentamethylene-3-methylurea,
1,1-tetramethylene-3-methylurea, and the like.

Similar substituted thioureas to the above illustrative substituted ureas can also be employed, such as:

1,3-dimethylthiourea,
Trimethylthiourea,
1,3-diethylthiourea,
1,3-dioctylthiourea,
Tridodecylthiourea,
1-cyclohexyl-3-ethylthiourea,
1,3-dicyclohexylthiourea,
1,3-diphenylthiourea,
1,3-dibiphenylthiourea,
1-ethyl-3-naphthylthiourea,
1-ethyl-1-cyclohexyl-3-phenylthiourea,
1-benzyl-1-n-butyl-3-xylylthiourea,
1,3-ditolylthiourea,
1,3-di(p-n-butylphenyl)thiourea,
1,3-di[p-(3-methoxypropyl)phenyl]thiourea,
1-ethyl-3-(p-ethylphenyl)thiourea,
1,3-di(p-chlorophenyl)thiourea,
1-methyl-3-(p-ethoxyphenyl)thiourea,
1,3-dibenzylthiourea, and the like.

In addition to the aforesaid ureas and thioureas, the polyureas and polythioureas can be employed to promote the higher lactam polymerization, e.g. wherein R and R' of the above-described class of compounds, together as R''', is a divalent radical, free from reactive groups, joining two molecules of the urea together, i.e.:

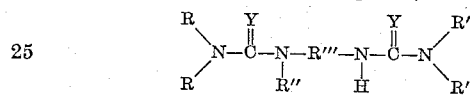

By the choice of the functionality of the components employed to make the polyurea it will be apparent that a large number of "urea" units can be present in the molecule as when a diamine is reacted with a diisocyanate or diisothiocyanate. As illustrative of the higher polyureas, equimolecular portions of ethylene diamine and diphenylmethane-4,4'-diisocyanate were reacted and the polyurea employed to promote the polymerization of ε-caprolactam in the presence of 1 mole percent of sodium hydride catalyst at 160° C. with a conversion of 96.5 percent of the caprolactam to the polycaprolactam. However, the lower polyureas are generally preferred such as the class of diureas formed by the reaction of 1 mole of a difunctional compound with two moles of a monofunctional compound, as for example, a diisocyanate or diisothiocyanate with a monoamine, or a diamine with a monoisocyanate or a monoisothiocyanate. From the foregoing illustrative examples it will be apparent that the term "urea" when employed in the broad sense such as "urea promoter compound," etc., is intended to embrace the disclosed class of substituted ureas and thioureas.

The amount of urea promoter compound employed in the instant anionic polymerization process can be varied to contain up to about 20 mole percent, based on the higher lactam monomer, as hereinafter more fully illustrated, but generally up to 5 mole percent of the urea promoter compound is ample. Preferably the urea promoter concentration will vary from about 0.05 to about 2 mole percent, and more preferably still from about 0.1 to about 1 mole percent of the higher lactam monomer.

Suitable catalysts in the base-catalyzed polymerization of the higher lactams to polylactams and especially of ε-caprolactam to polycaprolactam for use in conjunction with the urea promoters are any of the metals, which can be in metallic, complex ion, or a compound form, and are capable of forming lactam salts, e.g. with ε-caprolactam,

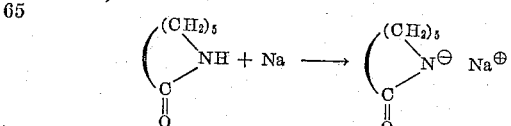

Common examples of such catalysts suitable for the anionic polymerization of the higher lactams are the alkali and alkaline earth metals, e.g., sodium, potassium, lithium, calcium, strontium, barium, magnesium, etc., either in metallic form or in the form of hydrides, borohydrides, oxides, hydroxides, carbonates, etc. However, in the case of compounds such as the hydroxides and carbonates, which give off water when reacted with lactams, the bulk of such water must be removed from the polymerization system, for example, by the application of heat and/or reduced pressures, before the base-catalyzed polymerization can take place. If such water is not removed, the lactam ion is not stable and hydrolytic polymerization will take place rather than base-catalyzed polymerization, i.e. anionic polymerization. Other effective catalysts are the organometallic derivatives of the foregoing metals as well as of other metals. Examples of such organo-metallic compounds are the lithium, potassium, and sodium alkyls such as butyl lithium, ethyl potassium, or proply sodium, or the aryl compounds of such metals such as sodium phenyl, triphenylmethylsodium, and the like. Other suitable organo-metallic compounds are diphenyl magnesium, zinc diethyl, triisopropyl aluminum, diisobutyl aluminum hydride, etc. As a general class, the materials known as Grignard reagents are effective base catalysts for the present polymerization. Typical of such Grignard catalysts are ethyl magnesium chloride, methyl magnesium bromide, phenyl magnesium bromide, and the like. Other suitable catalysts are sodium amide, magnesium amide and magnesium anilide, as well as numerous others.

The catalyst concentration employed in the instant process can vary from a small fraction of 1 mole percent, e.g. from about 0.01 mole percent, to as much as 15 to 20 mole percent based on the lactam monomer. In general, however, the preferred catalyst concentrations will vary from about 0.05 to about 5 mole percent and more preferably still from about 0.1 to about 1 mole percent.

The following examples are illustrative of this invention.

*Example 1*

A closed reaction vessel fitted with a gas inlet and exit tube was charged with 1 mole (113 g.) of ε-caprolactam and the vessel was purged with nitrogen. Then 0.005 mole (0.44 g.) of 1,3-dimethylurea was added thereto and the mixture fluidified by heating the raction vessel and contents to about 100° C. in an oil bath. Sodium hydride catalyst in the amount of 0.005 mole (0.12 g.) was then introduced into the reaction vessel with mixing and the temperature raised to 160° C. over a period of about 16 minutes and then held at 160° C. for about 1.25 hours. A white, homogenous polycaprolactam was recovered. The polycaprolactam was put in Dry Ice overnight and then ground through a ³⁄₁₆" screen in a Cumberland grinder. The ground polymer sample was washed with a solution of 0.5 percent formic acid and then with water, after which the washed sample was dried at 105° C. for 18 hours. The dried polymer was white and the conversion of ε-caprolactam to polycaprolactam was found to be 97.3 percent.

*Example 2*

A control experiment was run in a similar manner to Example 1, but without the presence of the 1,3-dimethylurea promoter and the mixture was held at 160° C. for over 12 hours. The small amount of polymer product recovered was found to represent a conversion of about 0.8 percent.

*Example 3*

In a similar manner to Example 1, a mixture of 1 mole of ε-caprolactam, 0.005 mole of 1,3-di-n-octadecylurea, and 0.005 mole of sodium hydride was heated to 160° C. The reaction mixture was solidified after about 49 minutes. The reaction mixture was held at about 160° C. for a total time of 3 hours. After treatment as described under Example 1, the recovered white polycaprolactam was found to represent a conversion of 96.8 percent.

*Example 4*

In a similar manner to Example 1, 1 mole of ε-caprolactam was introduced into the reaction vessel, fluidified, and 0.005 mole (1.06 g.) of 1,3-diphenylurea melted and added thereto. Then 0.005 mole of sodium hydride catalyst was introduced into the reaction mixture and the temperature raised to 160° C. over a period of about 14 minutes. The reaction mixture was a solid mass after about 25 minutes and was held at about 160° C. for a total time of 1 hour. The white polycaprolactam obtained was found to represent a conversion of 97.1 percent.

In another experiment 103 g. of ε-caprolactam and 0.005 mole of 1,3-diphenylurea were melted together under nitrogen and heated to 215° C. Then 0.005 mole of sodium hydride dissolved in 10 g. of ε-caprolactam was added thereto and the reaction mass became very viscous within 15 seconds. The reaction mass was allowed to cool and after about 9 minutes the temperature was about 170° C. and the reaction mass was starting to solidify. The reaction mass was then held at about 160° C. for 1 hour. The conversion to polycaprolactam was found to be 96.3 percent.

*Example 5*

In a similar manner to Example 1, 0.00625 mole of 1-(3-dimethylaminopropyl)-3-phenylurea and 1 mole of ε-caprolactam were melted together to give a clear solution. Then 0.00625 mole (0.15 g.) of sodium hydride was added thereto at about 100° C. and the temperature of the reaction mixture raised to about 160° C. The reaction mass was a solid mass about 25 minutes after the addition of the cataylst. After a total time of about 2 hours at 160° C. the reaction mass was cooled, ground, leached, washed, and dried as in Example 1 and the conversion was found to be 98.5 percent.

*Example 6*

In a similar manner to Example 1, 1 mole of ε-caprolactam and 0.05 mole of tetramethylene urea were melted together at 110° C. under nitrogen and 0.1 g. of sodium hydride was added thereto. The temperature was raised to about 160° C. over a 20-minute period and 10 minutes thereafter the reaction mass started to solidify. After an additional 0.5 hour at 160° C. the reaction mass had pulled loose from the walls of the reaction vessel. The grayish white polycaprolactam product was cooled after a total time of about 12 hours at 160° C. and the conversion found to be 99.2 percent.

In a similar experiment 0.2 mole of tetramethylene urea was employed. The reaction was terminated about 1.25 hours after the addition of the catalyst and the conversion to polycaprolactam was found to be 99.1 percent.

*Example 7*

In a similar manner to Example 1, 1 mole of ε-caprolactam was heated to 105° C. under nitrogen and 0.005 mole (1.16 g.) of 1,3-di(trimethylsilylmethyl)urea added thereto and was soluble therein. Then 0.005 mole of sodium hydride was added and the temperature raised to 160° C. over about a 15-minute period. The reaction mass was solid after about 35 to 40 minutes at 160° C. The reaction mass was held at 160° C. for a total time of about 4 hours, then cooled. The conversion to polycaprolactam was found to be 98.7 percent.

*Example 8*

In a similar manner to Example 7, 0.005 mole (2.4 g.) of 1,3-di(diphenylmethylsilylmethyl)urea was added to 1 mole of ε-caprolactam and then 0.005 mole of sodium hydride was added and the temperature raised to 160° C. over about a 15-minute period. The reaction mass was set up after about 20 minutes at 160° C. After a total time of about 4 hours at 160° C. the reaction mass was cooled and the conversion to polycaprolactam found to be 98.7 percent.

*Example 9*

In a similar manner to Example 7, 0.005 mole (2.12 g.) of 1,3 - di(p-chlorophenyldimethylsilylmethyl)urea was added to 1 mole of ε-caprolactam and then 0.005 mole of sodium hydride was added and the temperature raised to 160° C. over about a 15-minute period. The reaction mass was set up after about 10 minutes at 160° C. After a total time of about 4 hours at 160° C. the reaction mass was cooled and the conversion to polycaprolactam found to be 98.4 percent.

*Example 10*

A series of experiments was run wherein the polymerization temperature was varied from 100° to 160° C. in 20-degree increments. The reaction mixture in each experiment consisted of 1 mole of ε-caprolactam, 0.005 mole of 1,3-diphenylurea, and 0.005 mole of sodium hydride catalyst. The ε-caprolactam was heated to the indicated temperature, the promoter and catalyst added thereto and the temperature of the system maintained for 2 hours and then cooled. The conversion of the ε-caprolactam to polycaprolactam was found to be as follows.

| Temperature of polymerization: | Percent conversion |
|---|---|
| 100° C. | 0.3 |
| 120° C. | 4.0 |
| 140° C. | 86.9 |
| 160° C. | 97.5 |

This polymerization system thus has a long pot life at the lower temperatures. Accordingly, it is particularly useful when the polycaprolactam is desired to be used with reinforcing materials. The fluid polymerization system can be introduced to the mold, forms or casting apparatus at temperatures up to about 120° C. and any entrapped bubbles can be readily removed prior to raising the temperature of the polymerization system to effect the rapid conversion to polycaprolactam.

*Example 11*

In a similar apparatus to that employed in Example 1, a mixture of 1 mole of ε-caprolactam and 0.01 mole of sodium hydride was heated under nitrogen to fluidify the lactam. Then 0.005 mole of 1,3-diphenylthiourea was added thereto and dissolved therein. The mixture was heated to 180° C. and held thereat for 4.5 hours. The conversion of ε-caprolactam to polycaprolactam was found to be 93.5 percent.

*Example 12*

In a similar apparatus to that employed in Example 1, a mixture of 1 mole of ε-caprolactam and 0.005 mole of 1,1-di-n-butyl-3-phenylurea was heated to 160° C. and 0.005 mole of sodium hydride was added thereto. An increase in viscosity was readily apparent 2.5 minutes after the addition of the catalyst. After about 17 minutes the reaction mixture was solidified. The white polycaprolactam polymer was cooled after a total time of 2 hours from the introduction of the catalyst and the conversion of the ε-caprolactam to polycaprolactam was found to be 98.0 percent.

Other advantages of the urea-initiated polymerization system are that a very white polymer such as polycaprolactam can be produced, the molecular weight of the polymer can be readily controlled by the concentration of the particular urea promoter employed, i.e., the molecular weight is an inverse function of the urea concentration, and it has been found that the polymer product has a relatively narrow molecular weight distribution. It will be readily understood that the instant process is suitable for the direct polymerization casting of objects or for the preparation of molding and extrusion grade polymer such as polycaprolactam.

As stated above, the polymerization system can be held for long periods at the lower temperatures and then polymerization can be effected rapidly by raising the temperature to from about 140° C. to about 200° C. or higher, and preferably from to about 150° C. to about 190° C. Whereas polymerization temperatures higher than 200° C. can be employed, e.g. up to about 250° C., the conversion of the lactam monomer to the polylactam, e.g., of ε-caprolactam to polycaprolactam, is reduced with increasing temperature due to the thermal equilibrium established between the monomer and polymer.

We claim:

1. A process for effecting the polymerization of a higher lactam containing at least 6 carbon atoms in the lactam ring, comprising the anionic polymerization of the said lactam at a temperature of from about 120° C. up to about 250° C. in the presence of an effective amount of from about 0.05 up to about 20 mole percent, based on the lactam, of an N,N'-substituted urea promoter having the structural formula

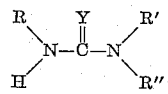

wherein Y is a member selected from the group consisting of O and S; and R and R' are selected from the group consisting of monovalent organic radicals and divalent organic radicals substantially free from reactive carboxyl, hydroxyl, and primary amino groups, the R'' group is selected from the group consisting of R and hydrogen, and the said divalent radicals are formed from the group consisting of R and R' together forming a tetramethylene chain, and R' and R'' together forming a polymethylene chain containing from 2 to 5 carbon atoms in said chain; and polyureas wherein R and R' together, each R and R' being selected from separate urea molecules having the aforesaid structural formula, such that they form a link between the said urea molecules and said link is a divalent organic radical substantially free from reactive carboxyl, hydroxyl, and primary amino groups.

2. The process of claim 1, wherein the urea promoter is present in an amount up to 5 mole percent, based on the lactam.

3. The process of claim 2, wherein the polymerization temperature is from about 140° C. to about 200° C.

4. The process of claim 1, wherein the lactam is ε-caprolactam and the urea promoter is present in an amount of from about 0.05 to about 2 mole percent, based on the ε-caprolactam, and the polymerization temperature is from about 150° C. to about 190° C.

5. The process of claim 3, wherein the lactam is ε-caprolactam and the urea promoter is a symmetrical N,N'-disubstituted compound.

6. The process of claim 5, wherein Y is oxygen and R and R' are hydrocarbyl radicals.

7. The process of claim 6, wherein the hydrocarbyl radicals contain up to 20 carbon atoms.

8. The process of claim 7, wherein the urea promoter is 1,3-diphenylurea.

9. The process of claim 7, wherein the urea promoter is 1,3-dimethylurea.

10. The process of claim 7, wherein the urea promoter is 1,3-di-n-octadecylurea.

11. The process of claim 5, wherein the urea promoter is tetramethyleneurea.

12. The process of claim 5, wherein Y is sulfur and R and R' are hydrocarbyl radicals containing up to 20 carbon atoms.

13. The process of claim 12, wherein the urea promoter is 1,3-diphenylthiourea.

14. The process of claim 5, wherein the urea promoter is 1,3-di(trimethylsilylmethyl)urea.

15. The process of claim 5, wherein the urea promoter is 1,3-di(diphenylmethylsilylmethyl)urea.

16. The process of claim 5, wherein the urea promoter is 1,3-di(p-chlorophenyldimethylsilylmethyl)urea.

17. A process for effecting the polymerization of ε-caprolactam comprising the anionic polymerization of ε-caprolactam at a temperature from about 120° C. up to about 200° C. in the presence of an effective amount from about 0.05 up to about 5 mole percent, based on the ε-caprolactam, of a promoter compound selected from the group consisting of N,N'-disubstituted and N,N,N'-trisubstituted ureas and thioureas and mixtures thereof, wherein the N- and N'-substituents to the said ureas and thioureas are hydrocarbon radicals containing up to 20 carbon atoms.

18. The process of claim 17, wherein the urea promoter is 1-(3-dimethylaminopropyl)-3-phenylurea and the polymerization temperature is from about 140° C. to about 200° C.

19. The process of claim 17, wherein the urea promoter is 1,1-di-n-butyl-3-phenylurea and the polymerization temperature is from about 140° C. to about 200° C.

20. A process for casting a polyamide by polymerizing in situ a lactam containing at least 6 carbon atoms in the lactam ring, said polymerization being conducted at a temperature above about 120° C. and up to about 200° C. in the presence of an anionic polymerization catalyst and an effective amount of from about 0.05 up to about 5 mole percent, based on the lactam, of a promoter selected from the group consisting of N,N'-disubstituted and N,N,N'-trisubstituted ureas and thioureas and mixtures thereof, wherein the N- and N'-substituents to the said ureas and thioureas are hydrocarbon radicals containing up to 20 carbon atoms.

21. A process for effecting the polymerization of a higher lactam containing at least 6 carbon atoms in the lactam ring, comprising the anionic polymerization of the said lactam at a temperature of from about 120° C. up to about 250° C. in the presence of an effective amount of from about 0.05 up to about 20 mole percent, based on the lactam, of an N,N'-substituted urea promoter selected from the class of compounds (A) having the structural formula

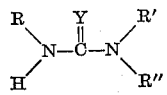

wherein Y is a member selected from the group consisting of O and S; R and R' are selected from the group consisting of (a) monovalent organic radicals each selected from the group consisting of hydrocarbyl radicals and modified hydrocarbyl radicals containing at least one member from the group consisting of halogen atoms, the oxa structure, the oxy structure, the thia structure, the tertiary amino structure, and the silyl structure, wherein all of the silicon bonds are directly joined to a carbon atom, and said modified hydrocarbyl radicals are substantially free from other atoms and structure and (b) R and R' together is a divalent tetramethylene radical; R" is selected from the group consisting of (a) the hydrogen atom and the monovalent organic radicals R' and (b) R' and R" together form a divalent polymethylene linking chain containing from 2 to 5 carbon atoms in said chain; and (B) polyureas wherein R and R' are each selected from separate urea molecules having the structural formula set forth above and together form a divalent linking radical between the separate urea molecules, which linking radical is selected from the group consisting of divalent hydrocarbon radicals and modified divalent hydrocarbon radicals containing at least one member from the group consisting of halogen atoms, the oxa structure, the oxy structure, the silyl structure, the thia structure, the tertiary amino structure, and the silyl structure, wherein all of the silicon bonds are directly joined to a carbon atom, and said modified divalent hydrocarbon radicals are substantially free from other atoms and structure.

22. A process for effecting the polymerization of ε-caprolactam comprising the anionic polymerization of ε-caprolactam in the presence of an effective amount from about 0.05 up to about 5 mole percent, based on the ε-caprolactam, of a promoter compound selected from the group consisting of N,N'-disubstituted and N,N,N'-trisubstituted ureas and thioureas and mixtures thereof, wherein the N- and N'-substituted radicals are selected from the group consisting of hydrocarbon radicals and modified hydrocarbon radicals containing at least one member from the group consisting of halogen atoms, the oxa structure, the oxy structure, the thia structure, the tertiary amino structure, and the silyl structure, wherein all of the silicon bonds are directly joined to a carbon atom, and said modified hydrocarbon radicals are substantially free from other atoms and structure.

23. The process of claim 3, wherein Y is oxygen and R, R' and R" are hydrocarbyl radicals.

24. The process of claim 23, wherein the hydrocarbyl radicals contain up to 20 carbon atoms.

References Cited in the file of this patent
UNITED STATES PATENTS

| | | |
|---|---|---|
| 2,241,321 | Schlack | May 6, 1941 |
| 2,867,805 | Ludewig | Jan. 6, 1959 |